US011018765B1

(12) United States Patent
Kim et al.

(10) Patent No.: US 11,018,765 B1
(45) Date of Patent: May 25, 2021

(54) METHOD OF OPTICAL APERTURE INTEGRATION FOR PRODUCING SYMMETRIC IRRADIANCE PATTERN

(71) Applicant: X Development LLC, Mountain View, CA (US)

(72) Inventors: Nam-hyong Kim, San Jose, CA (US); Baris Erkmen, Sunnyvale, CA (US); Andrei Kazmierski, Pleasanton, CA (US); Devin Brinkley, Redwood City, CA (US); John Moody, Belmont, CA (US); Markus Demartini, Alameda, CA (US); Wei-cheng Lai, Sunnyvale, CA (US); Halleh Balch, Oakland, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 16/697,541

(22) Filed: Nov. 27, 2019

(51) Int. Cl.
*H04B 10/00* (2013.01)
*H04B 10/112* (2013.01)
*H04B 10/67* (2013.01)
*H04J 14/00* (2006.01)

(52) U.S. Cl.
CPC ......... *H04B 10/1125* (2013.01); *H04B 10/67* (2013.01)

(58) Field of Classification Search
CPC ... H04B 10/11; H04B 10/112; H04B 10/1121; H04B 10/1123; H04B 10/1125; H04B 10/1127; H04B 10/1129; H04B 10/114; H04B 10/1141; H04B 10/1143; H04B 10/1149; H04B 10/116; H04B 10/118
See application file for complete search history.

(56) References Cited

U.S. PATENT DOCUMENTS

| 7,002,131 | B1 | 2/2006 | Lewis |
| 7,773,202 | B2 | 8/2010 | Crawford et al. |
| 8,797,531 | B2 | 8/2014 | Knox et al. |
| 2007/0217795 | A1* | 9/2007 | Otte ..................... H04B 10/112 398/212 |

(Continued)

FOREIGN PATENT DOCUMENTS

CN 104833655 B 10/2018

OTHER PUBLICATIONS

International Search Report and Written Opinion for Application No. PCTUS2062071 dated Mar. 19, 2021.

(Continued)

*Primary Examiner* — Daniel G Dobson
(74) *Attorney, Agent, or Firm* — Botos Churchill IP Law (57) ABSTRACT

Aspects of the disclosure provide an optical communication system. The system may include a receiver lens system configured to receive a light beam from a remote optical communication system and direct the light beam to a photodetector. The system may also include the photodetector. The photodetector may be configured to convert the received light beam into an electrical signal, and the photodetector may be positioned at a focal plane of the receiver lens system. The system may also include a phase-aberrating element arranged with respect to the receiver lens system and the photodetector such that the phase-aberrating element is configured to provide uniform angular irradiance at the focal plane of the receiver lens system.

20 Claims, 7 Drawing Sheets

(56) References Cited

U.S. PATENT DOCUMENTS

2008/0310852 A1* 12/2008 Tan .................... H04B 10/803
398/136

OTHER PUBLICATIONS

Jing Ma et al., "Research on real time detection of departure angle for the laser beam through atmospheric channels", Applied Optics, Oct. 10, 2011, pp. 5615-5623, Optical Society of America, Washington, DC, US, vol. 50, No. 29.

Yagiz Kaymak et al., "A Survey on Acquisition, Tracking, and Pointing Mechanisms for Mobile Free-Space Optical Communications", IEEE Communications Surveys & Tutorials, 2018, pp. 1104-1123, vol. 20, No. 2, Second Quarter.

* cited by examiner

METHOD OF OPTICAL APERTURE INTEGRATION FOR PRODUCING SYMMETRIC IRRADIANCE PATTERN

BACKGROUND

Information can be transmitted over directional point-to-point networks, such as aerospace and other mobile networks. In such networks, links can be formed between pairs of nodes, or terminals at each node, by aiming lens systems of each node pair towards each other. In some implementations, the nodes may transmit and receive optical signals through free space optical communication (FSOC) links.

BRIEF SUMMARY

Aspects of the disclosure provide a first optical communication system comprising a receiver lens system configured to receive a light beam from a second optical communication system remote from the first optical communication system, the receiver lens system being further configured to direct the light beam to a photodetector; the photodetector configured to convert the received light beam into an electrical signal, the photodetector being positioned at a focal plane of the receiver lens system; and a phase-aberrating element arranged with respect to the receiver lens system and the photodetector such that the phase-aberrating element is configured to provide uniform angular irradiance at the focal plane of the receiver lens system.

In one example, the phase-aberrating element is arranged between the receiver lens system and the photodetector. In this example, the phase-aberrating element is arranged closer to the receiver lens system than the photodetector. Alternatively, the phase-aberrating element is arranged closer to the photodetector than the receiver lens system. In another example, the phase-aberrating element is arranged such that in operation, a received light beam passes through the phase-aberrating element before passing through the receiver lens system. In another example, the system also includes one or more processors in communication with the photodetector, the one or more processors being configured to: determine a center point of the light beam received at the photodetector; determine an average irradiance of the light beam received at the photodetector; identify an average irradiance point of the light beam on the photodetector having the average irradiance; and send instructions for performing an adjustment to the optical communication system according to a difference between the average irradiance point and the center point. In this example, the system also includes a mirror, and the adjustment is an adjustment of the mirror. In addition or alternatively, the system also includes a lens, and the adjustment is an adjustment of the lens. In addition or alternatively, the instructions are configured to cause an adjustment to the received light beam such that the average irradiance point and the center point move towards one another. In addition or alternatively, the instructions are configured to cause an adjustment to the received light beam such that the average irradiance point and the center point overlap. In another example, the system also includes one or more processors in communication with the photodetector, the one or more processors being configured to use the electrical signal to control an aspect of the first communication system. In this example, the system also includes a mirror, and controlling an aspect of the first communication system includes adjusting the mirror. In addition or alternatively, the system also includes a lens, and controlling an aspect of the first communication system includes adjusting the lens.

Another aspect of the disclosure provides a method of controlling an aspect of a first communication device. The method includes receiving, at the first communication device, a light beam from a second communication device remote from the first communication device; passing the received light beam through a receiver lens system which focuses the light beam towards a photodetector; passing the received light beam through a phase-aberrating element before reaching the received light beam reaches the photodetector; receiving the received light beam at the photodetector which generates an electrical signal; and using the electrical signal to control an aspect of the first communication system.

In one example, passing the received light beam through the phase-aberrating element causes uniform angular irradiance at a focal plane of the receiver lens system. In another example, the received light is passed through the phase-aberrating element before the received light is passed through the receiver lens system. In another example, the received light is passed through the phase-aberrating element after the received light is passed through the receiver lens system. In another example, the aspect is a mirror. In another example, the aspect is a lens. In another example, the method also includes determining a center point of the light beam received at the photodetector; determining an average irradiance of the light beam received at the photodetector; and identifying an average irradiance point of the light beam on the photodetector having the average irradiance, and using the electrical signal to control an aspect of the first communication system includes sending instructions for performing an adjustment to the aspect according to a difference between the average irradiance point and the center point.

DETAILED DESCRIPTION

Overview

The technology relates to an optical architecture for producing an irradiance pattern on a position-sensing photodetector of sufficient minimum size and sufficient regularized irradiance, from nonuniform or time-varying irradiance input, such that its geometric center can be estimated accurately by the position-sensing photodetector system. In other words, the optical architecture may expand the minimum spot size achievable at the focus of the optical system, and may homogenize the energy received from the input, removing "hot spots" in the focused light beam that may be large enough to cause significant skew in the estimate of the center of the spot. Irradiance non-uniformity of the input may be caused by atmospheric turbulence, sub-aperture sampling of a nonuniform-irradiance beam, the presence of obstacles, etc. The intensity profile of the light beam being more homogenized may allow for more accurate tracking of the light beam for purposes of free-space optical communications.

The optical communication system may also include a phase-aberrating element. The phase-aberrating element may be positioned between the receiver lens system and the photodetector or before the receiver lens system and the photodetector. The phase-aberrating element may include a diffractive or refractive ordered or random array elements configured to diffuse the light beam incident on the position-sensing photodetector.

When the phase-aberrating element is included in the optical communication system, a tracking system of the optical communication system may be configured to determine an angle of arrival of the light beam received on the photodetector. The phase-aberrating element may create smoothened beam spot at the focal plane with a desired irradiance size and an irradiance profile centered around the geometric center of the beam. In other words, the phase-aberrating element may homogenize the incoming beam and smooth out any non-uniformities inherent to the incident beam irradiance profile. This may be achieved by overlapping the beamlets via the receiver lens system that pass through each of the microelements of the phase-aberrating element.

One or more processors of the optical communication system may control a mirror or lens to adjust the received light beam according to a difference between the average irradiance point and the center point. In another implementation, the one or more processors may adjust a pointing direction of the receiver based on the difference between the average irradiance point and the center point. Adjusting the pointing direction may comprise moving a gimbal that includes the receiver lens system, controlling a mirror or lens of the receiver lens system, or moving the overall optical communication system.

The features described herein may provide for an optical communication system that creates links that are more robust to atmospheric turbulence. Tracking of light beams may be more accurate because there are fewer inconsistencies caused by hot spots in the input light beam. The optical communication system may be more efficient as a result. A user of the optical communication system may experience better connection or coverage and transmit or receive data quicker.

Example Systems

Figure 1:
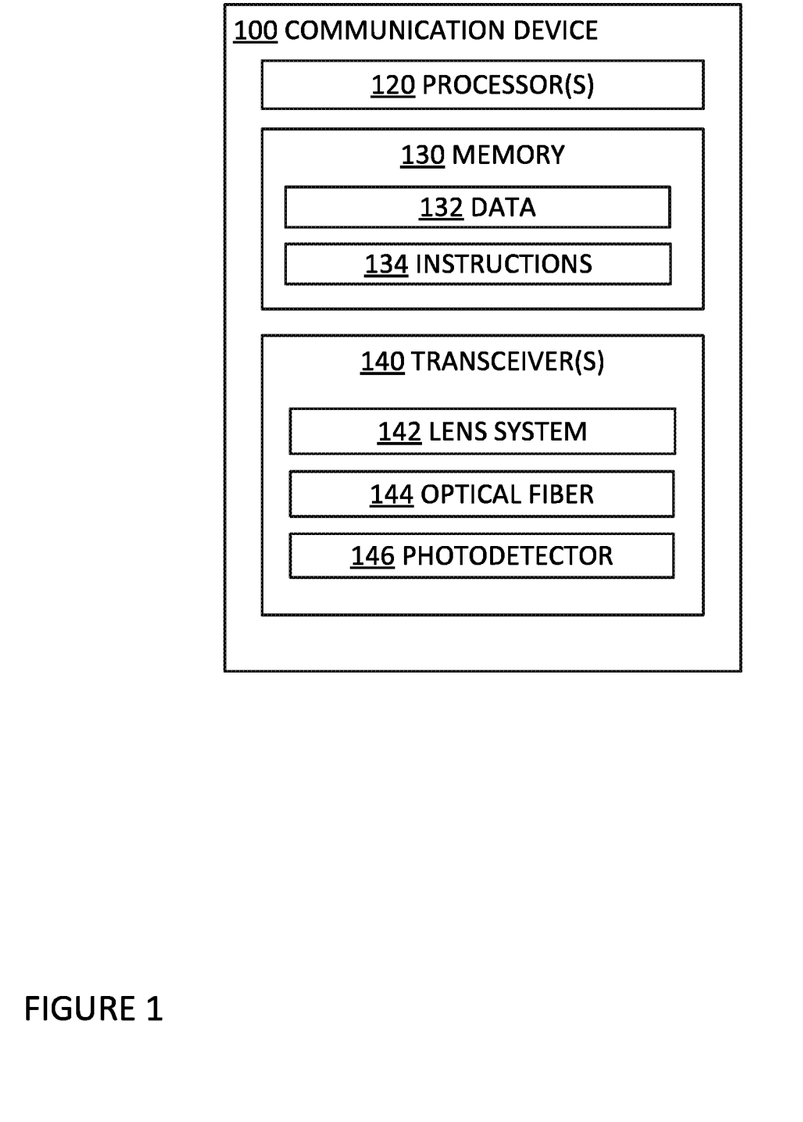
FIG. 1 is a functional diagram of aspects of an optical communication system in accordance with aspects of the disclosure.

FIG. 1 shows an optical communication system 100 that includes one or more processors 120, a memory 130, and one or more transceivers 140. The optical communication system 100 may be configured to form one or more communication links with other optical communication systems or devices. The one or more processors 120 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 120 and memory 130 as being within the same block, it will be understood that the one or more processors 120 and memory 130 may actually comprise multiple processors and memories that may or may not be stored within the same physical housing. Accordingly, references to a processor or computer will be understood to include references to a collection of processors or computers or memories that may or may not operate in parallel.

Memory 130 stores information accessible by the one or more processors 120, including data 132 and instructions 134 that may be executed by the one or more processors 120. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the instructions and data are stored on different types of media.

Data 132 may be retrieved, stored or modified by the one or more processors 120 in accordance with the instructions 134. For instance, although the system and method is not limited by any particular data structure, the data 132 may be stored in computer registers, in a relational database as a table having a plurality of different fields and records, XML documents or flat files.

Instructions 134 may be any set of instructions to be executed directly (such as machine code) or indirectly (such as scripts) by the one or more processors 120. For example, the instructions 134 may be stored as computer code on the computer-readable medium. In that regard, the terms "instructions" and "programs" may be used interchangeably herein. The instructions 134 may be stored in object code format for direct processing by the one or more processors 120, or in any other computer language including scripts or collections of independent source code modules that are interpreted on demand or compiled in advance. Functions, methods and routines of the instructions 134 are explained in more detail below.

Figure 2:
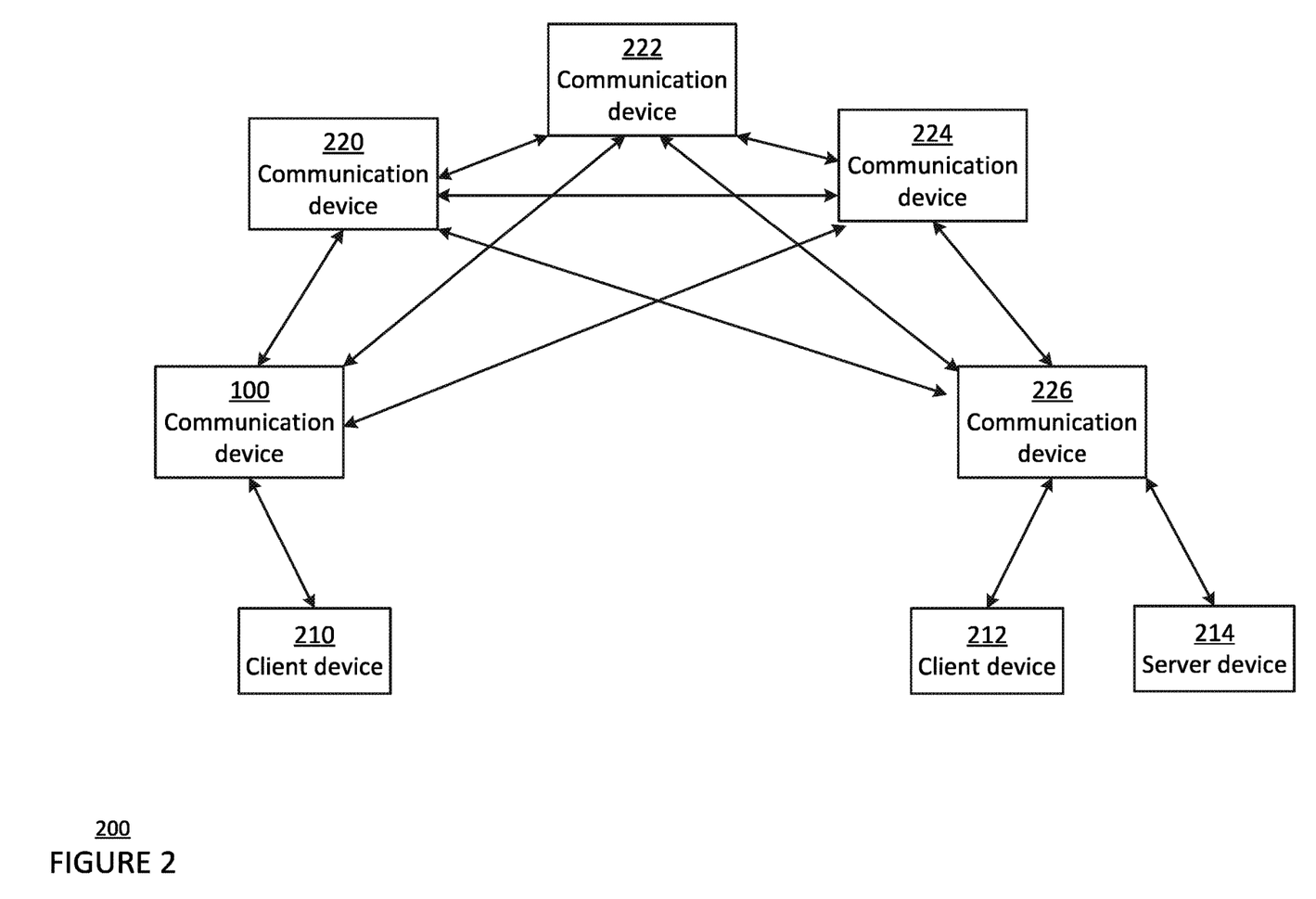
FIG. 2 is a functional diagram of a network in accordance with aspects of the disclosure.

The one or more transceivers 140 may be configured to transmit and receive optical frequencies via cable, fiber, or free space. One or more additional transceivers may also be included that are configured to transmit and receive radio frequencies or other frequencies. The one or more transceivers 140 are configured to communicate with one or more other communication devices via one or more communication links. In FIG. 2, the communication device 100 is shown having communication links (illustrated as arrows) with client device 210 and communication devices 220, 222, and 224.

With a plurality of communication devices, the communication device 100 may form a communication network, such as network 200 in FIG. 2. The network 200 includes client devices 210 and 212, server device 214, and communication devices 100, 220, 222, 224, and 226. Each of the client devices 210, 212, server device 214, and communication devices 220, 222, 224, and 226 may include one or more processors, a memory, and one or more transceivers. The one or more processors may be any well-known processor or a dedicated controller similar to the one or more processors described above. The memory may store information accessible by the one or more processors, including data and instructions that may be executed by the one or more processors. The memory, data, and instructions may be configured similarly to memory 130, data 132, and instructions 134 described above. Using the one or more transceivers, each communication device in network 200 may form at least one communication link with another communication device, as shown by the arrows. The communication links may be for optical frequencies, radio frequencies, other frequencies, or a combination of frequency bands.

Figure 7:
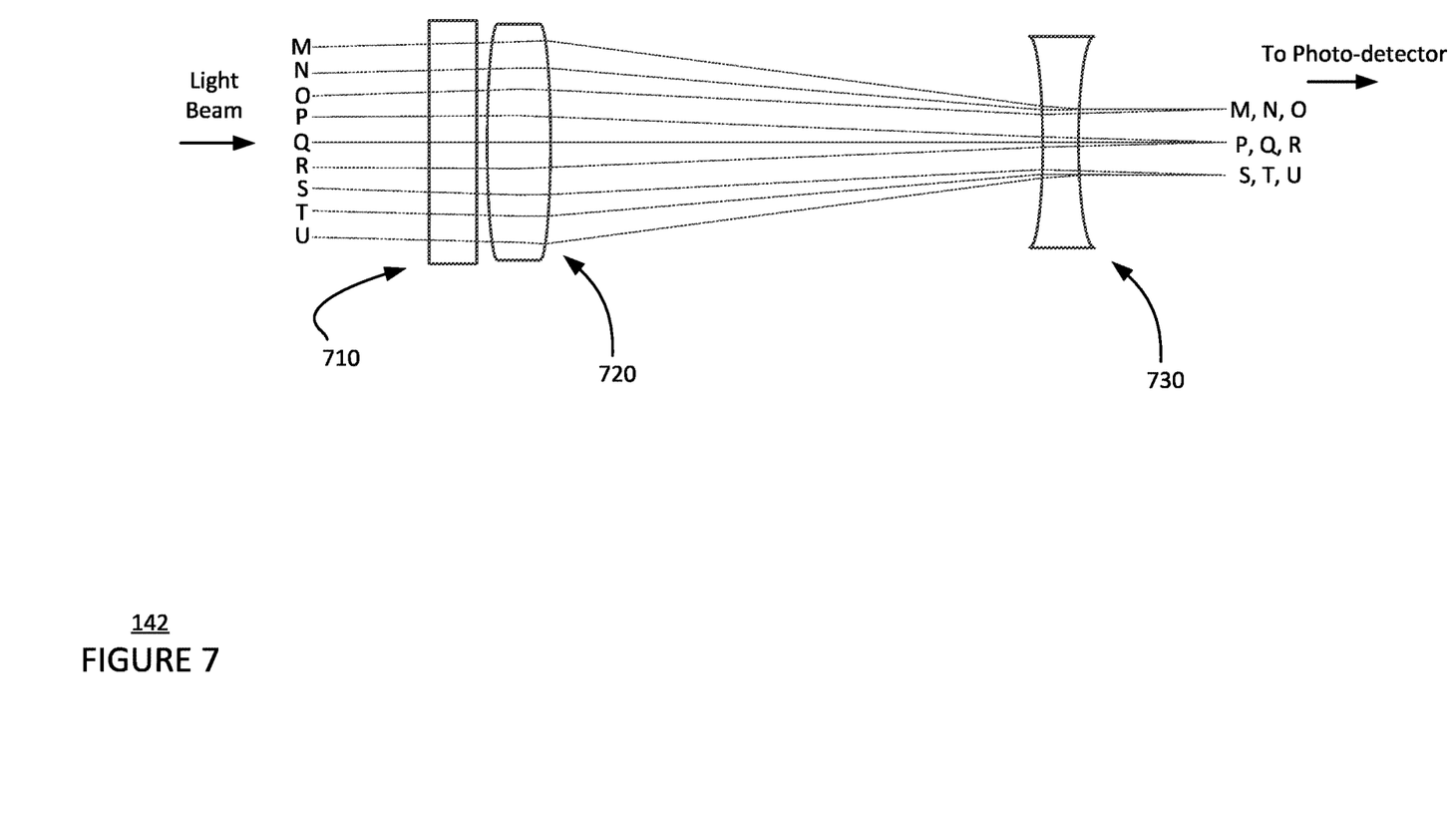
FIG. 7 is an example of a lens receiver system in accordance with aspects of the disclosure.

Returning to FIG. 1, the one or more transceivers 140 of the optical communication system 100 includes a receiver lens system 142, an optical fiber 144, and a photodetector 146 as well as one or more filters and static or movable mirrors (not shown). The receiver lens system may be configured to focus an input light beam using one or more lenses. The receiver lens system may include a lens or a group of lenses or mirrors that can focus the light towards the photodetector 146 as well as one or more filters. The lenses may be selected according to the location of the lens in the system and may be formed from any number of materials including glass, plastics, etc. FIG. 7 depicts an example configuration of a lens system, though other configurations may be used in conjunction with the features described herein. In this example, the receiver lens system 142 includes a filter 710, through which a plurality of beamlets or ray bundles (e.g. M, N, O, P, Q, R, S, T, U) of the received light beam at the desired wavelength pass, and other wavelengths of unwanted wavelengths do not as they may be absorbed or reflected). For instance, the filter 710 may be an interference filter such as an interference-type band pass filter or any other type of filter that can be used to filter undesired wavelengths from the transmitted light beam. Thereafter, the beamlets may pass through a convex lens 720 and subsequently a concave lens 730. As a result, the beamlets are focused towards the photodetector 146.

The photodetector may be a multi-pixel sensor or other types of position-sensing detector located at the focal plane of the receiver lens system. In certain instances, the pixel size and the gap distance between pixels of the photodetector may be such that a diffraction-limited light beam focused by the receiver lens system to the position-sensing detector may fall into a single pixel of the photodetector. For example, a width of the pixel added with the gap distance on either side of the width may be larger than a diameter of the focused light beam. In such instances, when a light beam is only received by one pixel of the photodetector, the accuracy of position estimate for the center of the light beam may be poor.

Figure 3:
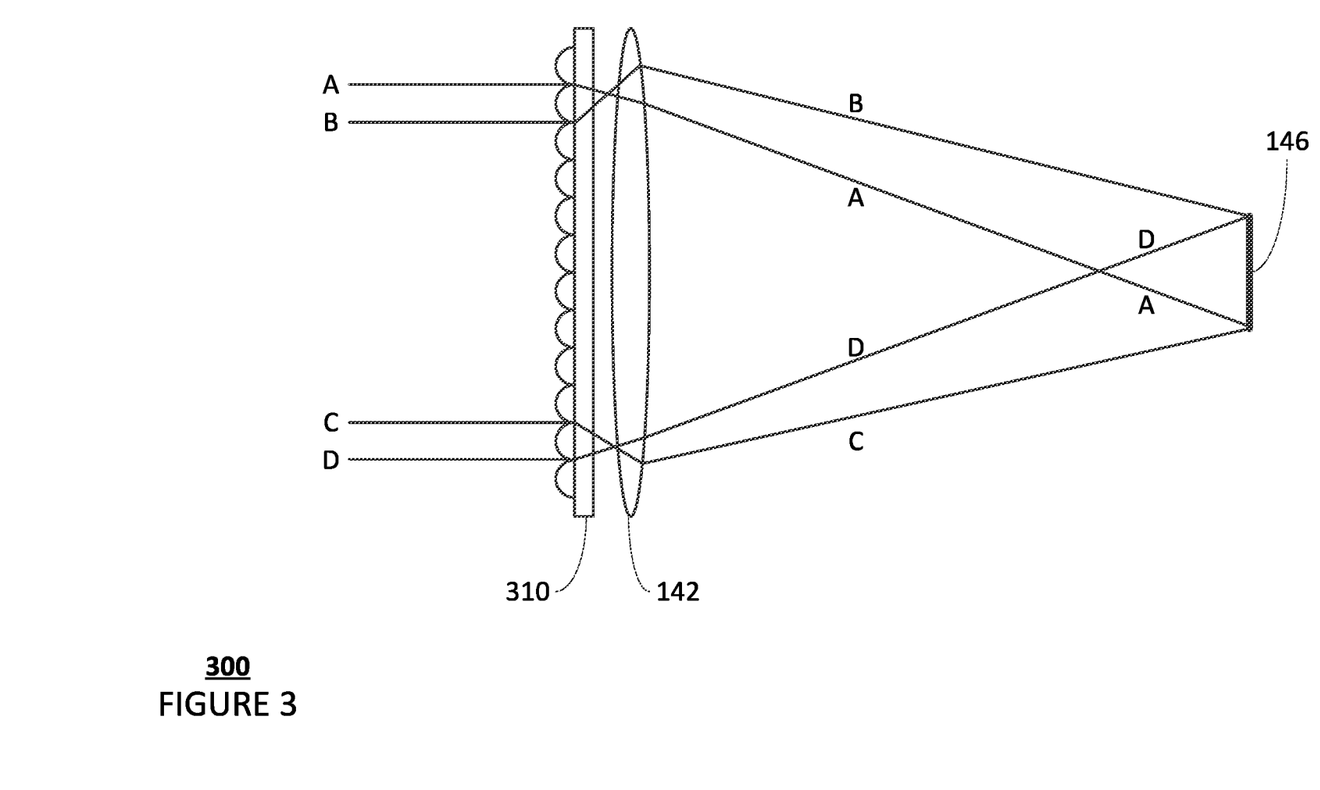
FIG. 3 is a pictorial diagram of aspects of an optical communication system with a phase-aberrating element in accordance with aspects of the disclosure.
Figure 4:
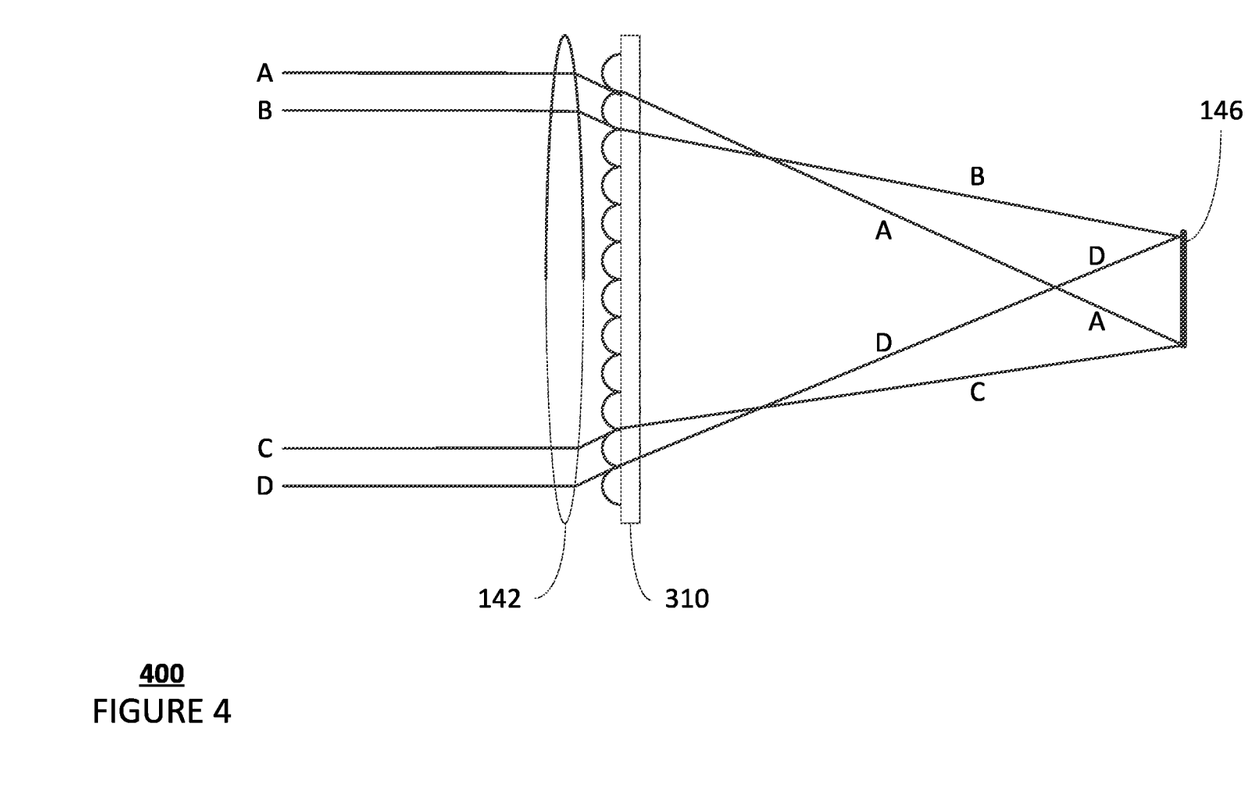
FIG. 4 is another pictorial diagram of aspects of an optical communication system with a phase-aberrating element in accordance with aspects of the disclosure.
Figure 5:
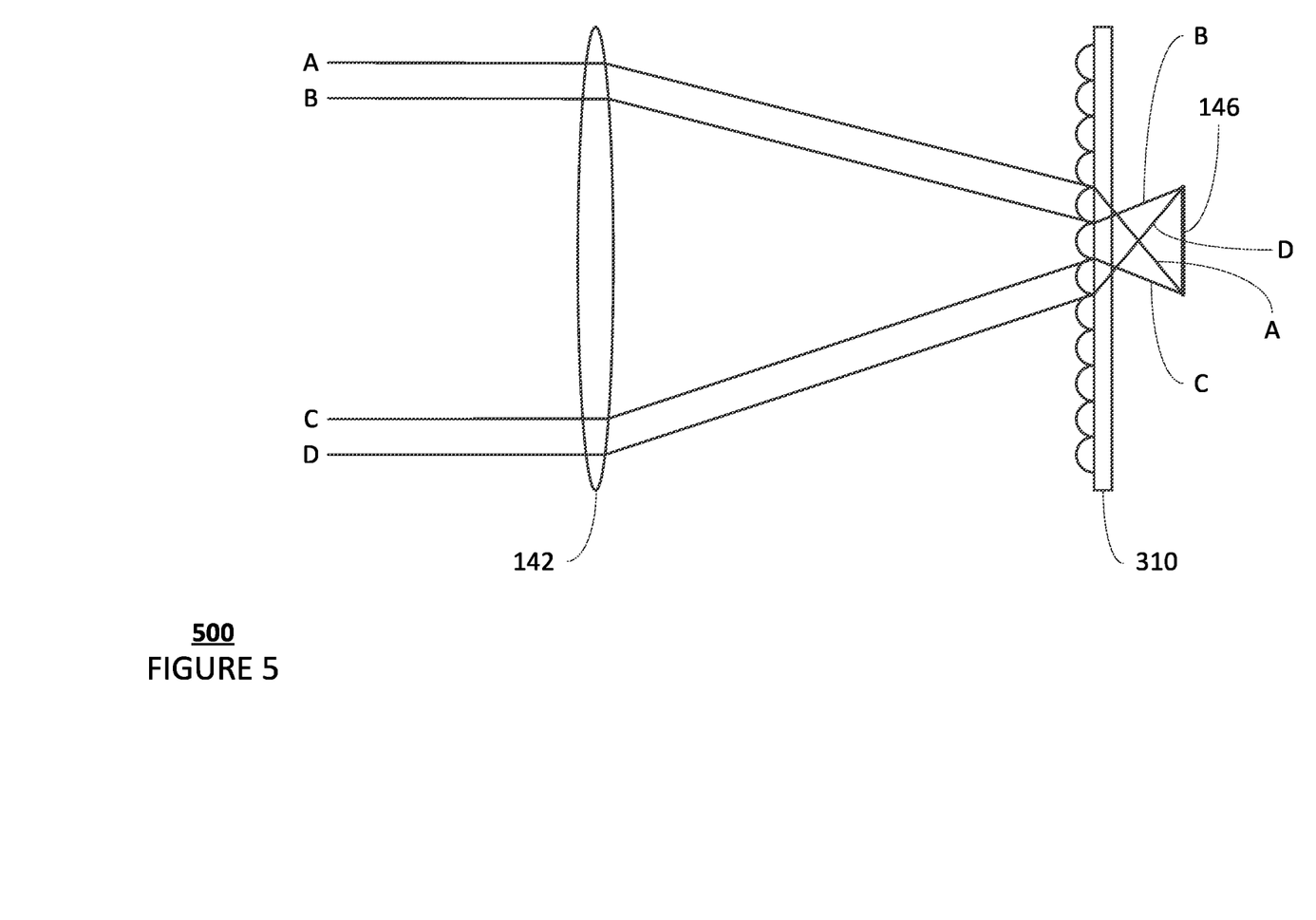
FIG. 5 is a further pictorial diagram of aspects of an optical communication system with a phase-aberrating element in accordance with aspects of the disclosure.

In order to improve the accuracy of the estimate of position of the center of the beam incident on the position-sensing device, the optical system shown in FIGS. 3-5 may have a phase-aberrating element (e.g., a diffuser, a hologram or other phase-aberrating element) that spreads the beam incident on the position-sensing device. This phase-aberrating element may be positioned between the receiver lens system and the photodetector or before the receiver lens system and the photodetector. Example distances between the phase-aberrating element and the receiver lens system may range from zero, such that the phase-aberrating element is in contact with the receiver lens system, up to a distance equivalent to the focal length of the receiver lens system. For instance, the phase-aberrating element may be positioned as close as possible to the receiver lens system or at a distance on the order of 1-3 mm, prior to or after the receiver lens system. Alternatively, the phase-aberrating element may be positioned closer to the photodetector, though the angular divergence may be greater in this example.

FIGS. 3, 4 and 5 are examples 300, 400, 500 depicting different positions of an example phase-aberrating element 310 with respect to the receiver lens system 142 and the photodetector 146. For example, turning to FIG. 3, the phase-aberrating element 310 is positioned prior to the receiver lens system 142 along a path of light traveling to the photodetector 146. In this example, a light beam (represented by beamlets A, B, C, D) passes through the phase-aberrating element 310 before the light passes through the receiver lens system 142. The receiver lens system 142 directs the light beam towards the photodetector 146. As another example, turning to FIG. 4, the phase-aberrating element 310 is positioned between the receiver lens system 142 and the photodetector 146. Here, the phase-aberrating element 310 is positioned closer to the receiver lens system 142 than the photodetector 146. In this example, a light beam (represented by beamlets A, B, C, D) passes through the receiver lens system 142 which directs the light beam towards the photodetector 146. However, before reaching the photodetector 146 the light beam also passes through the phase-aberrating element. As another example, turning to FIG. 5, the phase-aberrating element 310 is positioned between the receiver lens system 142 and the photodetector 146. Here, the phase-aberrating element 310 is positioned closer to the photodetector 146 than the receiver lens system 142. In this example, a light beam (represented by beamlets A, B, C, D) passes through the receiver lens system 142 which directs the light beam towards the photodetector 146. However, before reaching the photodetector 146 the light beam also passes through the phase-aberrating element.

The phase-aberrating element 310 may be a thin, transmissive element with a nonuniform transverse phase profile sufficient to induce angular spread of the rays incident on it. The phase-aberrating element may include a diffractive or refractive ordered or random array elements configured to diffuse the light beam received from the receiver lens system before the light beam travels to the photodetector. In some instances, the phase-aberrating element 310 may include a micro-lens array such as a quasi-random or random array of refractive and or diffractive microelements, such as holograms and phase gratings. The refractive microelements (i.e. micro-lenses) may be positive (piano-convex), negative (piano-concave) or a combination of both. Each micro-lens in the array should refract or diffract a small portion of the incident beam to cause an increase in angular divergence. The phase-aberrating element pattern may be formed directly into the phase-aberrating element substrate, or replicated on to the surface of the phase-aberrating element substrate. In some instances, the phase-aberrating element microelements may be small enough such that the incident beam intersects multiple microelements at any given position. In addition, the angular divergence of the phase-aberrating element 310 may be matched to the focal length of the receiver lens system 142 such that the resulting spot (measured at the plane of the photodetector 146) of homogenized light has a nominal diameter larger than a gap between the pixels of the photodetector and smaller than the diameter of the photodetector.

The phase-aberrating element 310 may be made of common optical materials including glass, plastic, silicon, silica, or quartz. In some examples, the phase-aberrating element may be made of other materials that are (i) at least partially transparent to the received light beam and (ii) are able to be formed into the required shape for the diffused beam angle.

The size of the phase-aberrating element 310 may be selected according to the input beam size as well as the desired spatial sampling. Higher spatial sampling may yield better beam uniformity at the focal plane. Increasing the beam diameter for a given phase-aberrating element may improve the phase-aberrating element performance. For an example, beam sizes for laser communication tracking application could range from 1 mm to 10 mm and the phase-aberrating element diameter could range from 2 mm to 25 mm.

Example Operations

Figure 6:
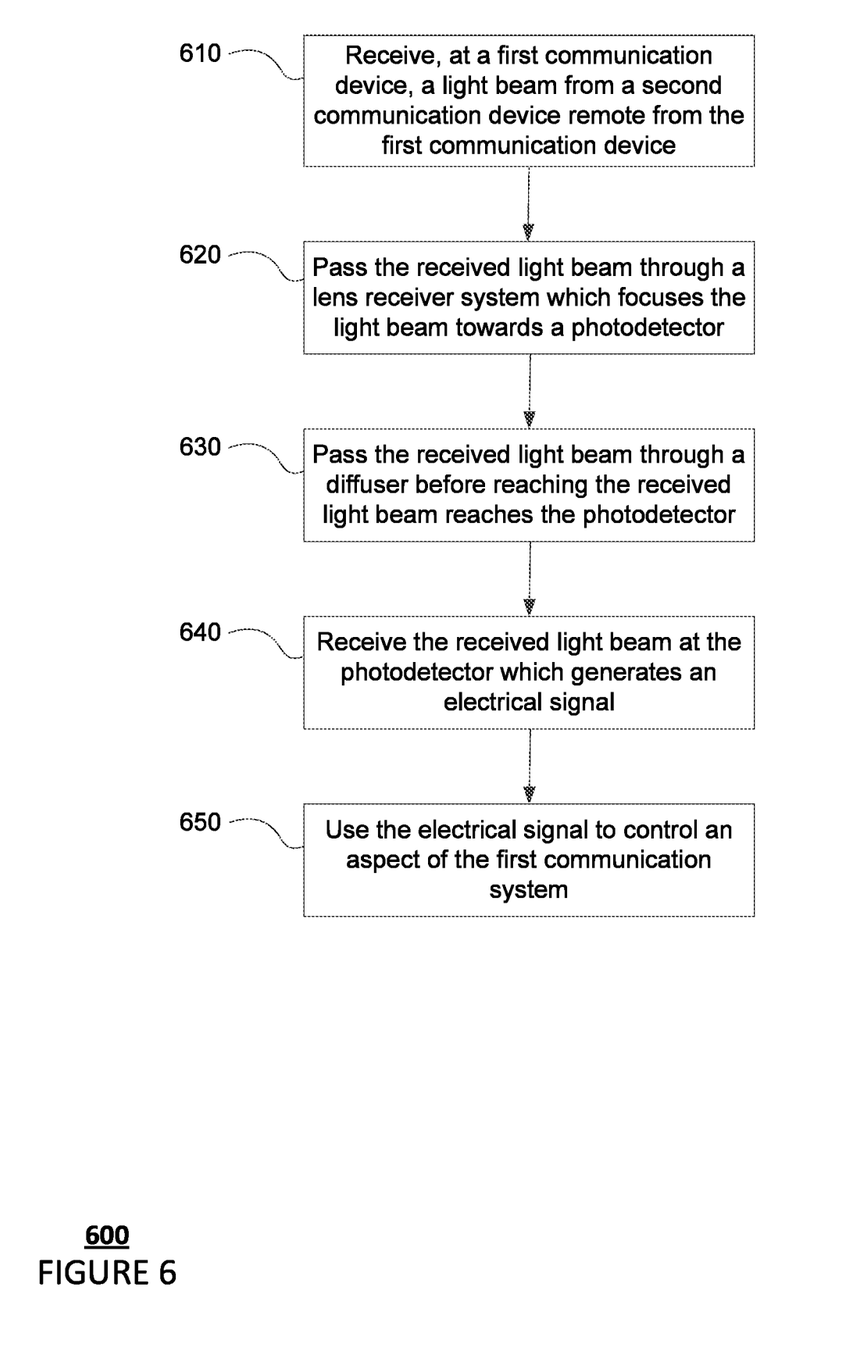
FIG. 6 is a flow diagram in accordance with aspects of the disclosure.

FIG. 6 is an example flow diagram 600 in accordance with aspects of the disclosure. For instance, at block 610, a light beam is received by a first communication device from a second communication device remote from the first communication device. For instance, the communication device 220 may generate a light beam. The light beam may travel through free space eventually reaching the communication device 100. Once received at the communication device 100, the light beam may pass through an aperture and be reflected by one or more mirrors in order to direct the light beam towards the receiver lens system 142, phase-aberrating element 310, and photodetector 146.

At block 620, the received light beam passes through a receiver lens system which focuses the light beam towards a photodetector. For instance, at the communication device 100, the light beam may be directed, for instance via one or more mirrors (not shown), towards the receiver lens system 142 which focuses the light towards the photodetector 146. Referring to the example receiver lens system of FIG. 7, the light beam may travel through free space and passes through the filter 710 which may remove unwanted wavelengths from the incident beam and only transmits desired wavelengths. The transmitted light beam then passes through the convex lens 720 and the concave lens 710 thereby focusing the light beam towards the photodetector. The light beam may then continue to travel through free space towards the photodetector 146.

At block 630, the received light beam passes through a phase-aberrating element before the received light beam reaches the photodetector. Before or after passing through the receiver lens system, the light may also pass through the phase-aberrating element. For example, turning to FIG. 3, a light beam (represented by beamlets A, B, C, D) passes through the phase-aberrating element 310 before the light beam passes through the receiver lens system 142. The receiver lens system 142 also directs the light towards the photodetector 146. As another example, returning to FIG. 4, a light beam (represented by beamlets A, B, C, D) passes through the receiver lens system 142 which also directs the light beam towards the photodetector 146. However, before reaching the photodetector 146 the light also passes through the phase-aberrating element 310. As another example, returning to FIG. 5, a light beam (represented by beamlets A, B, C, D) passes through the receiver lens system 142 which directs the light beam towards the photodetector 146. However, before reaching the photodetector 146 the light also passes through the phase-aberrating element 310.

In each of the Examples of FIGS. 3, 4 and 5, the phase-aberrating element 310 may create a uniform angular irradiance at the focal plane of the receiver lens system 142 with a desired angular divergence. In other words, the phase-aberrating element 310 may homogenize an incoming light beam and smooth out any non-uniformities inherent to the incident beam irradiance profile at the photodetector 146. This may be achieved by overlapping the beamlets or ray bundles (e.g. A, B, C and D) of the received light beam via the receiver lens system 142 (as shown in FIGS. 3, 4, and 5) before or after these beamlets pass through each of the microelements of the phase-aberrating element 310.

At block 640, the received light beam is received at the photodetector which generates an electrical signal in response to receiving the received light beam. The photodetector 146 may be configured to detect light (or a light beam) received at the surface of the photodetector and may convert the received light beam into an electrical signal using the photoelectric effect. The one or more processors 120 may be configured to use the photodetector 146 to derive data from the received light beam and control the optical communication system 100 in response to the derived data.

At block 650, the electrical signal may be used to control an aspect of the optical communication system. The one or more processors 120 may be configured to act as a tracking system for the optical communication system 100. For example, the one or more processors may determine a center point of the received light beam on the photodetector. The one or more processors 120 may then determine an average irradiance of the received light beam and identify an average irradiance point of the received light beam. The average irradiance point may be a point on the photodetector 146 where the average irradiance is detected. As noted above, the phase-aberrating element 310 may create a uniform angular irradiance at the focal plane of the receiver lens system with a desired angular divergence.

When the phase-aberrating element is included in the optical communication system, it may create smoothened beam spot at the focal plane with a desired irradiance size and an irradiance profile centered around the geometric center of the beam. In other words, the phase-aberrating element may homogenize the incoming beam and smooth out any non-uniformities inherent to the incident beam irradiance profile. This may be achieved by overlapping the beamlets via the receiver lens system that pass through each of the microelements of the phase-aberrating element.

The one or more processors 120 may send instructions for performing or configured to cause an adjustment to the optical communication system according to a difference between the average irradiance point and the center point. For instance, the one or more processors 120 may control a mirror or lens of the optical communication system 100 in order to adjust the location of received light beam at the receiver lens system according to a difference between the average irradiance point and the center point. For instance, the mirror or lens may be adjusted in order to adjust the received light beam such that the average irradiance point and the center point move closer together or eventually overlap (e.g. are the same point).

In other instances, the one or more processors 120 may adjust a pointing direction of a receiver (e.g. part of the transceiver 140) that receives the light beam based on the difference between the average irradiance point and the center point. Again, the adjustment may cause the average irradiance point and the center point to move closer together or eventually overlap (e.g. are the same point). As an example, adjusting the pointing direction may comprise moving a gimbal that includes the receiver lens system 142, controlling a mirror or lens of the receiver lens system 142, or moving the overall optical communication system 100.

The features described herein may provide for an optical communication system that creates links that are more robust to atmospheric turbulence, sub-aperture sampling of an input Gaussian beam, the presence of obstacles, etc. Tracking of light beams may be more accurate because there are fewer inconsistencies caused by hot spots in the input light beam. The optical communication system may be more efficient as a result. A user of the optical communication system may experience better connection or coverage and transmit or receive data quicker.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A first optical communication system comprising:
a receiver lens system configured to receive a light beam from a second optical communication system remote from the first optical communication system, the receiver lens system being further configured to direct the light beam to a photodetector;
the photodetector configured to convert the received light beam into an electrical signal, the photodetector being positioned at a focal plane of the receiver lens system; and
a phase-aberrating element arranged with respect to the receiver lens system and the photodetector such that the phase-aberrating element is configured to provide uniform angular irradiance at the focal plane of the receiver lens system.

2. The system of claim 1, wherein the phase-aberrating element is arranged between the receiver lens system and the photodetector.

3. The system of claim 2, wherein the phase-aberrating element is arranged closer to the receiver lens system than the photodetector.

4. The system of claim 2, wherein the phase-aberrating element is arranged closer to the photodetector than the receiver lens system.

5. The system of claim 1, wherein the phase-aberrating element is arranged such that in operation, a received light beam passes through the phase-aberrating element before passing through the receiver lens system.

6. The system of claim 1, further comprising one or more processors in communication with the photodetector, the one or more processors being configured to:
determine a center point of the light beam received at the photodetector;
determine an average irradiance of the light beam received at the photodetector;
identify an average irradiance point of the light beam on the photodetector having the average irradiance; and
send instructions for performing an adjustment to the optical communication system according to a difference between the average irradiance point and the center point.

7. The system of claim 6, further comprising a mirror, and wherein the adjustment is an adjustment of the mirror.

8. The system of claim 6, further comprising a lens, and wherein the adjustment is an adjustment of the lens.

9. The system of claim 6, wherein the instructions are configured to cause an adjustment to the received light beam such that the average irradiance point and the center point move towards one another.

10. The system of claim 6, wherein the instructions are configured to cause an adjustment to the received light beam such that the average irradiance point and the center point overlap.

11. The system of claim 1, further comprising one or more processors in communication with the photodetector, the one or more processors being configured to use the electrical signal to control an aspect of the first communication system.

12. The system of claim 11, further comprising a mirror, and wherein controlling an aspect of the first communication system includes adjusting the mirror.

13. The system of claim 11, further comprising a lens, and wherein controlling an aspect of the first communication system includes adjusting the lens.

14. A method of controlling an aspect of a first communication device, the method comprising:
receiving, at the first communication device, a light beam from a second communication device remote from the first communication device;
passing the received light beam through a receiver lens system which focuses the light beam towards a photodetector;
passing the received light beam through a phase-aberrating element before the received light beam reaches the photodetector to cause uniform angular irradiance at a focal plane of the receiving lens system;
receiving the received light beam at the photodetector which generates an electrical signal; and
using the electrical signal to control an aspect of the first communication device.

15. The method of claim 14, wherein the received light is passed through the phase-aberrating element before the received light is passed through the receiver lens system.

16. The method of claim 14, wherein the received light is passed through the phase-aberrating element after the received light is passed through the receiver lens system.

17. The method of claim 14, wherein the aspect is a mirror.

18. The method of claim 14, wherein the aspect is a lens.

19. The method of claim 14, further comprising:
determining a center point of the light beam received at the photodetector;
determining an average irradiance of the light beam received at the photodetector; and
identifying an average irradiance point of the light beam on the photodetector having the average irradiance, and wherein using the electrical signal to control an aspect of the first communication device includes sending instructions for performing an adjustment to the aspect according to a difference between the average irradiance point and the center point.

20. The method of claim 14, wherein, when received at the photodetector, the received light beam has a diameter larger than a gap between pixels of the photodetector.

* * * * *

UNITED STATES PATENT AND TRADEMARK OFFICE
CERTIFICATE OF CORRECTION

PATENT NO. : 11,018,765 B1  
APPLICATION NO. : 16/697541  
DATED : May 25, 2021  
INVENTOR(S) : Kim et al.

Page 1 of 3

It is certified that error appears in the above-identified patent and that said Letters Patent is hereby corrected as shown below:

In the Claims

Claim 2, Column 9, Line 31:  
Now reads: "The system"; should read -- The first optical communication system --

Claim 3, Column 9, Line 34:  
Now reads: "The system"; should read -- The first optical communication system --

Claim 4, Column 9, Line 37:  
Now reads: "The system"; should read -- The first optical communication system --

Claim 5, Column 9, Line 40:  
Now reads: "The system"; should read -- The first optical communication system --

Claim 6, Column 9, Line 44:  
Now reads: "The system"; should read -- The first optical communication system --

Claim 6, Column 9, Lines 53 and 54:  
Now reads: "the optical communication system"; should read -- the first optical communication system --

Claim 7, Column 9, Line 57:  
Now reads: "The system"; should read -- The first optical communication system --

Claim 8, Column 9, Line 59:  
Now reads: "The system"; should read -- The first optical communication system --

Claim 9, Column 10, Line 1:  
Now reads: "The system"; should read -- The first optical communication system --

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*

Claim 10, Column 10, Line 5:
Now reads: "The system"; should read -- The first optical communication system --

Claim 11, Column 10, Line 9:
Now reads: "The system"; should read -- The first optical communication system --

Claim 11, Column 10, Lines 12 and 13:
Now reads: "first communication system"; should read -- first optical communication system --

Claim 12, Column 10, Line 14:
Now reads: "The system"; should read -- The first optical communication system --

Claim 12, Column 10, Lines 15 and 16:
Now reads: "first communication system"; should read -- first optical communication system --

Claim 13, Column 10, Line 17:
Now reads: "The system"; should read -- The first optical communication system --

Claim 13, Column 10, Lines 18 and 19:
Now reads: "first communication system"; should read -- first optical communication system --

Claim 14, Column 10, Line 26:
Now reads: "the light beam"; should read -- the received light beam --

Claim 14, Column 10, Line 31:
Now reads: "the receiving lens system;"; should read -- the receiver lens system; --

Claim 15, Column 10, Line 36:
Now reads: "received light"; should read -- received light beam --

Claim 15, Column 10, Line 38:
Now reads: "received light"; should read -- received light beam --

Claim 16, Column 10, Line 39:
Now reads: "received light"; should read -- received light beam --

Claim 16, Column 10, Line 41:
Now reads: "received light"; should read -- received light beam --

Claim 19, Column 10, Line 46:
Now reads: "received light"; should read -- received light beam --

Claim 19, Column 10, Line 48:
Now reads: "received light"; should read -- received light beam --

Claim 19, Column 10, Line 50:
Now reads: "received light"; should read -- received light beam --